(12) United States Patent
Rasanen et al.

(10) Patent No.: US 10,827,456 B2
(45) Date of Patent: Nov. 3, 2020

(54) METHODS, APPARATUSES AND COMPUTER PROGRAM PRODUCTS FOR SERVICE BASED MOBILITY MANAGEMENT

(71) Applicant: NOKIA SOLUTIONS AND NETWORKS OY, Espoo (FI)

(72) Inventors: Juha Antero Rasanen, Espoo (FI); Antti Jaakko Pasanen, Helsinki (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/112,279

(22) PCT Filed: Jan. 17, 2014

(86) PCT No.: PCT/EP2014/050923
§ 371 (c)(1),
(2) Date: Jul. 18, 2016

(87) PCT Pub. No.: WO2015/106823
PCT Pub. Date: Jul. 23, 2015

(65) Prior Publication Data
US 2016/0338004 A1    Nov. 17, 2016

(51) Int. Cl.
*H04W 68/02* (2009.01)
*H04L 29/06* (2006.01)
*H04W 8/02* (2009.01)

(52) U.S. Cl.
CPC ........... *H04W 68/02* (2013.01); *H04L 65/104* (2013.01); *H04L 65/105* (2013.01);
(Continued)

(58) Field of Classification Search
CPC combination set(s) only.
See application file for complete search history.

(56) References Cited

U.S. PATENT DOCUMENTS

| 2003/0026211 A1* | 2/2003 | Xu ....................... H04L 12/5692 370/252 |
| 2004/0047437 A1* | 3/2004 | Hamiti .................. H04W 28/18 375/326 |

(Continued)

FOREIGN PATENT DOCUMENTS

EP    2 154 846 A1    2/2010

OTHER PUBLICATIONS

International Search Report & Written Opinion dated Apr. 17, 2014 corresponding to International Patent Application No. PCT/EP2014/050923.

(Continued)

*Primary Examiner* — Muthuswamy G Manoharan
(74) *Attorney, Agent, or Firm* — Squire Patton Boggs (US) LLP

(57) ABSTRACT

According to methods for service based mobility management, a map between a plurality of service classes and/or message types and a plurality of predetermined contents of data packets is acquired (S101, S201, S301). A service class and/or message type is detected for an incoming request message (S102). A predetermined content of a data packet corresponding to the service class and/or message type is determined from the map (S103). The incoming request message is forwarded (S104) in the data packet including the predetermined content. Then, the predetermined content of the data packet is detected (S202), the service class and/or message type corresponding to the predetermined content is determined (S203) from the map, and the incoming request message is forwarded (S204) in a data block including a predetermined indication of the service class and/or message type determined.

8 Claims, 4 Drawing Sheets

(52) U.S. Cl.
CPC ...... *H04L 65/1006* (2013.01); *H04L 65/1016* (2013.01); *H04L 65/1036* (2013.01); *H04W 8/02* (2013.01)

(56) References Cited

U.S. PATENT DOCUMENTS

| | | | | |
|---|---|---|---|---|
| 2006/0167972 | A1* | 7/2006 | Zombek | H04L 67/02 709/202 |
| 2007/0259673 | A1* | 11/2007 | Willars | H04W 52/0225 455/453 |
| 2008/0166983 | A1* | 7/2008 | Liu | H04W 36/12 455/187.1 |
| 2012/0093086 | A1* | 4/2012 | Yin | H04L 69/16 370/328 |
| 2014/0269510 | A1* | 9/2014 | Xu | H04W 8/06 370/328 |
| 2014/0321283 | A1* | 10/2014 | Thyni | H04L 47/14 370/235 |

OTHER PUBLICATIONS

3GPP TS 24.229 V12.3.0 (Dec. 2013), Technical Specification, 3rd Generation Partnership Project; Technical Specification Group Core Network and Terminals; IP multimedia call control protocol based on Session Initiation Protocol (SIP) and Session Description Protocol (SDP); Stage 3 (Release 12), Dec. 2013, 821 pages.

3GPP TS 24.341 V12.3.0 (Dec. 2013), Technical Specification, 3rd Generation Partnership Project; Technical Specification Group Core Network and Terminals; Support of SMS over IP networks; Stage 3 (Release 12), Dec. 2013, 50 pages.

3GPP TS 29.281 V11.6.0 (Mar. 2013), Technical Specification, 3rd Generation Partnership Project; Technical Specification Group Core Network and Terminals; General Packet Radio System (GPRS) Tunnelling Protocol User Plane (GTPv1-U) (Release 11), Mar. 2013, 27 pages.

* cited by examiner

METHODS, APPARATUSES AND COMPUTER PROGRAM PRODUCTS FOR SERVICE BASED MOBILITY MANAGEMENT

BACKGROUND OF THE INVENTION

The present invention relates to methods, apparatuses and computer program products for service based mobility management.

The invention is applicable to a packet core network of a communication network system including an LTE communication system, such as an EPC.

The following meanings for the abbreviations used in this specification apply:
3GPP $3^{rd}$ generation partnership project
DDN Downlink data notification
EPC Evolved packet core
GTP-U General packet radio service tunnelling protocol user plane
GW Gateway
HSS Home subscriber server
ID Identity, Identifier
IMS IP multimedia subsystem
IP Internet protocol
LTE Long term evolution
MME Mobility management entity
PCRF Policy and charging rules function
P-CSCF Proxy call session control function
P-GW Packet data network gateway
PMIP Proxy mobile IP
PSS Packet switched streaming
SCI Service class indicator
S-CSCF Serving call session control function
SGSN Serving general packet radio service support node
S-GW Serving gateway
SIP Session initiation protocol
SMS Short message service
UE User equipment

SUMMARY OF THE INVENTION

The invention aims at improving service based mobility management in a communication network system, including the LTE communication system. For example, the invention aims at enabling a serving gateway to determine differences in SIP messages and in contents of SIP messages being forwarded via the serving gateway.

This is achieved at least in part by the methods, apparatuses and computer program products defined in the appended claims.

According to an exemplary embodiment of the invention, service based paging control is provided. In other words, paging procedures can be optimized in that message loading is reduced for lower priority services and faster paging is provided e.g. for certain real-time services in 3GPP mobile networks, being requested by some operators.

In the following the invention will be described by way of embodiments thereof with reference to the accompanying drawings.

DESCRIPTION OF THE EMBODIMENTS

Figure 1:
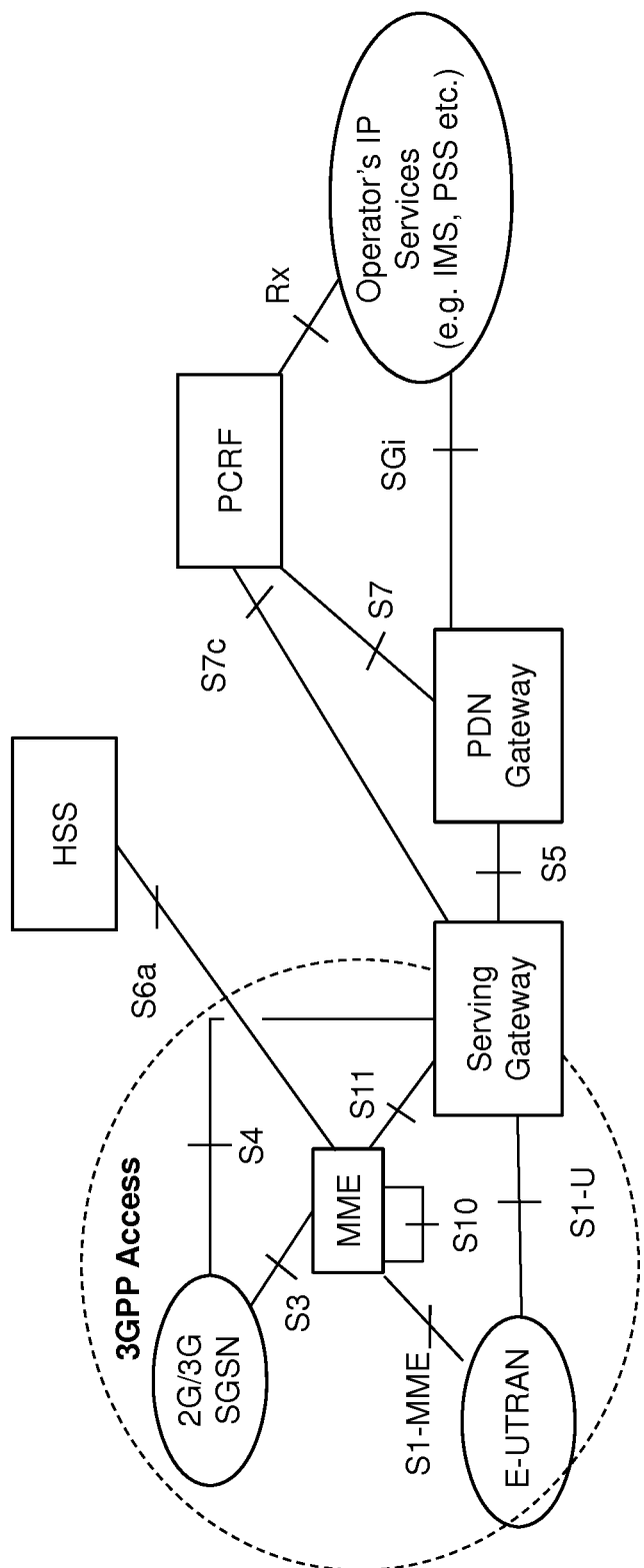
FIG. 1 shows a schematic diagram illustrating a 3GPP architecture to which examples of embodiments of the invention are applicable.

First, reference is made to FIG. 1 illustrating an architecture for 3GPP accesses within EPS using GTP based S5 between a PDN gateway (P-GW) and a serving gateway (S-GW). In this context it is to be noted that the invention is not limited to a GTP based interface, and it is also possible to use a PMIP interface between the P-GW and the S-GW.

The P-GW provides access between a 3GPP access network and a data network providing operator's IP services such as IMS, PSS, etc.

The 3GPP access network shown in FIG. 1 comprises an E-UTRAN and a 2G/3G SGSN connected to an MME via an S1-MME interface and an S3 interface. The MME is connected to the S-GW via an S11 interface. The E-UTRAN and the 2G/3G SGSN are connected to the S-GW via an S1-U interface and an S4 interface. The MME is connected to a HSS via an S6a interface.

In case of using GTP between the S-GW and the P-GW, the S-GW is connected to a PCRF via an S7c interface. The P-GW is connected to the PCRF via an S7 interface and to the IMS, PSS, etc. via an SGi interface. The PCRF is connected to the IMS, PSS, etc. via an Rx interface.

In practice, SIP signalling is encrypted between a P-CSCF of the IMS and a UE, the SIP signalling thus being a transparent bit stream for the S-GW, and consequently, type and content of a SIP signal are invisible to the S-GW or to the packet core and access network in general. Hence, the S-GW usually cannot determine differences in SIP messages and in contents of the SIP messages being forwarded via the S-GW.

This, however, causes a problem in a case when SMS paging is to be distinguished from VoLTE paging for the same IMS PDN, the SMS being transferred in a SIP message in this case.

According to examples of embodiments of the invention to be described in the following, the S-GW is enabled to determine differences in SIP messages and in contents of SIP messages being forwarded via the S-GW.

Figure 2:
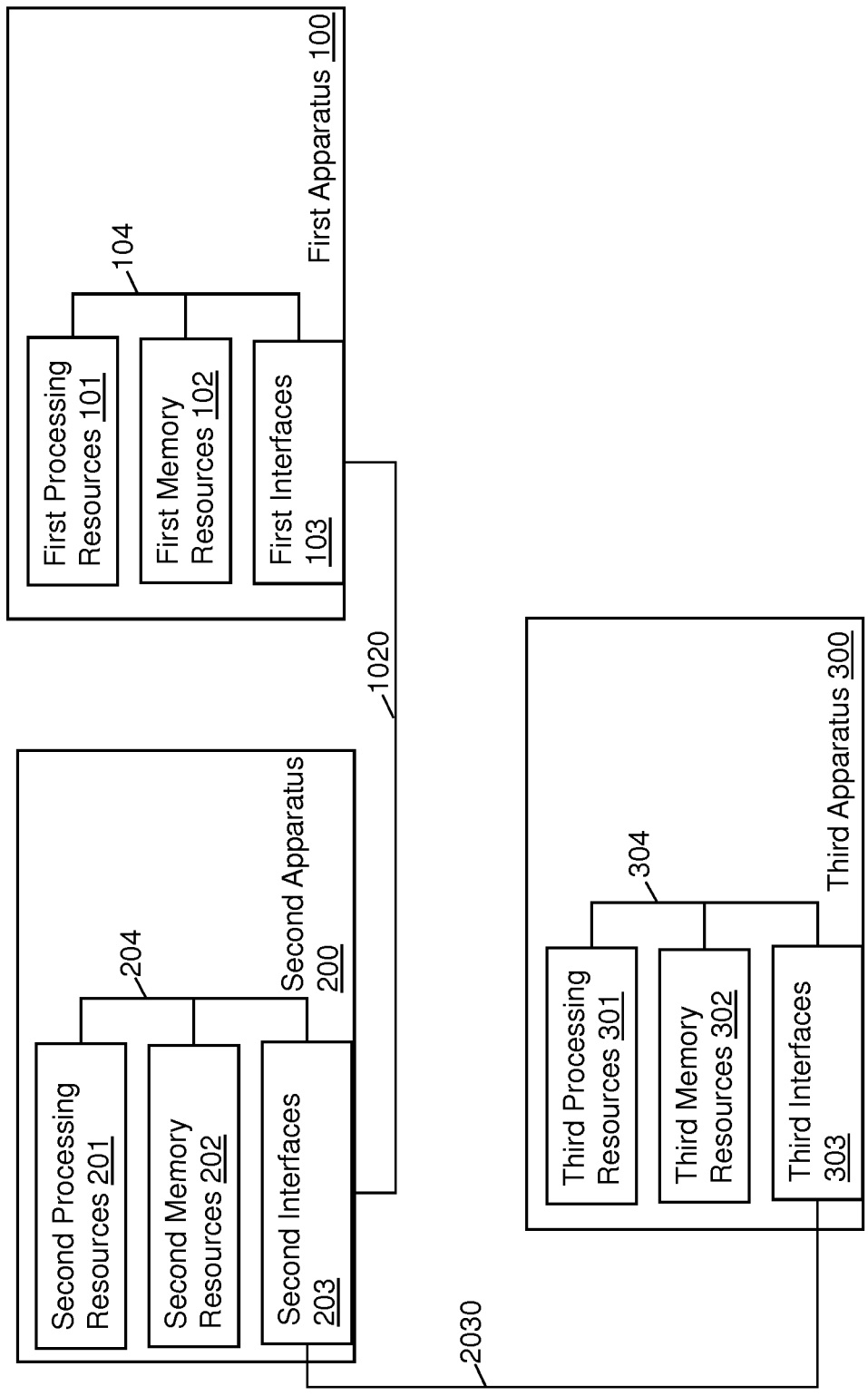
FIG. 2 shows a schematic block diagram illustrating a configuration of apparatuses in which examples of embodiments of the invention are implementable.

As a preliminary matter before exploring details of various implementations, reference is made to FIG. 2 for illustrating a simplified block diagram of various electronic apparatuses that are suitable for use in practicing the exemplary embodiments of this invention.

The first apparatus 100 which may be used by and/or may be a part of an IMS, e.g. a P-CSCF, comprises first processing resources 101, first memory resources 102 and first interfaces 103 which are connected by a link 104. The first memory resources 102 may store a first program.

The first apparatus 100 is connected via its first interfaces 103 through a link 1020 to a second apparatus 200 which may be used by and/or may be a part of a P-GW. The link 1020 may comprise an IP interface.

The second apparatus 200 comprises second processing resources 201, second memory resources 202 and second interfaces 203 which are connected by a link 204. The second memory resources 202 may store a second program.

The second apparatus 200 is connected via its second interfaces 203 through a link 2030 to a third apparatus 300 which may be used by and/or may be a part of an S-GW. The link 2030 may comprise a GTP and/or a PMIP interface.

The third apparatus 300 comprises third processing resources 301, third memory resources 302 and third interfaces 303 which are connected by a link 304. The third memory resources 302 may store a third program.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

In general, the exemplary embodiments of this invention may be implemented by computer software stored in the first, second, third memory resources 102, 202, 302 and executable by the first, second, third processing resources 101, 201, 301, or by hardware, or by a combination of software and/or firmware and hardware in any or all of the devices shown.

In general, the various embodiments of the UE can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The first, second, third memory resources 102, 202, 302 may be of any type suitable to the local technical environment and may be implemented using any suitable data storage technology, such as semiconductor-based memory devices, magnetic memory devices and systems, optical memory devices and systems, fixed memory and removable memory. The first, second, third processing resources 101, 201, 301 may be of any type suitable to the local technical environment, and may include one or more of general purpose computers, special purpose computers, microprocessors, digital signal processors (DSPs) and processors based on a multi-core processor architecture, as non-limiting examples.

Generally, references to certain standards, media and/or resources in this description are rather supposed to be exemplary for the purpose of illustration in order to improve the ease of understanding of the invention. They are not to be understood as limiting the invention. Likewise, the language as well as terms used herein, such as e. g. signal names, device names and the like, are to demonstrate the embodiments only. Use of such language or terms apart from their understanding according to this disclosure shall not be applied to the invention for the purpose of limiting its scope.

Figure 3:
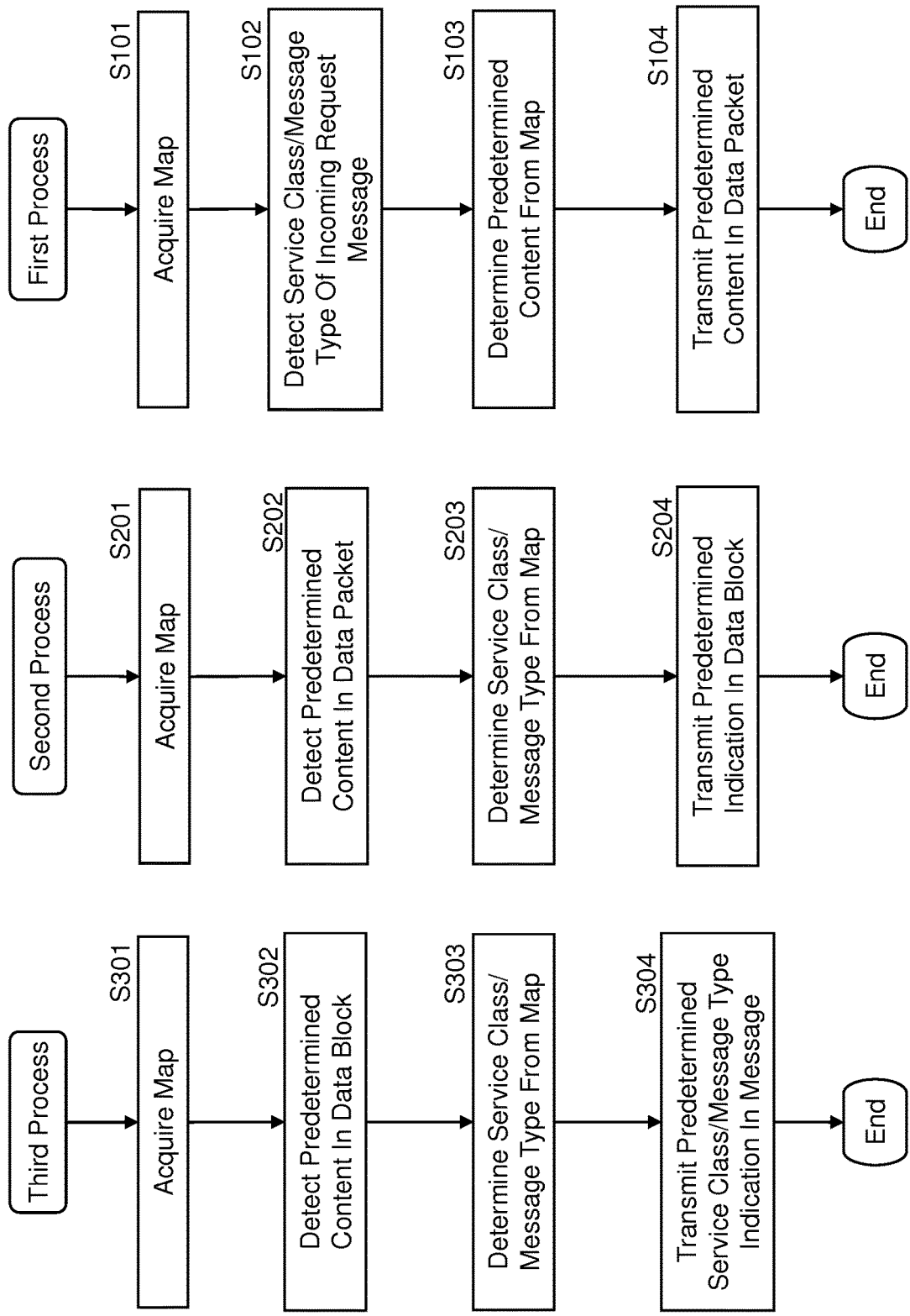
FIG. 3 shows flowcharts illustrating processes for improved service based mobility management according to examples of embodiments of the invention.

Now reference is made to FIG. 3 showing flowcharts illustrating first to third processes according to examples of embodiments of the invention, which may be executed by the first apparatus 100, second apparatus 200 and third apparatus 300, respectively.

According to examples of embodiments of the invention, the first process is implemented in a P-CSCF, the second process is implemented in a P-GW, and the third process is implemented in an S-GW.

In step S101 of the first process, a map between a plurality of service classes and/or message types and a plurality of predetermined contents of data packets is acquired.

According to a preferred first embodiment of the invention, the predetermined contents comprise predetermined addresses and/or ports used between the first apparatus 100 and the second apparatus 200.

According to an example of the first embodiment of the invention, the P-CSCF (and P-GW) is (are) configured to map the service classes/message types to given IP addresses and/or ports used between the P-CSCF and P-GW. For example, in IPv6 case the IPv6 prefix may be the same, but the exact IPv6 address (e.g. source, destination or both) under the prefix may match a given service class/message type. When ports are used, the same source IP address and the same destination IP address may be used between the P-CSCF and P-GW, but the port (e.g. source, destination or both) indicates the given service class/message type. According to an example of the first embodiment, the given (predetermined) addresses and/or ports also include via addresses and/or ports, i.e. the P-CSCF sends an IP packet towards a UE via a given address/port in the P-GW.

According to a second embodiment of the invention, the predetermined contents comprise predetermined coding. In other words, an alternative way for the usage of different IP addresses and/or ports for the separation of the service classes/message types between P-CSCF and P-GW is to add service class/message type related coding in an IP packet sent from the P-CSCF to the P-GW. According to an example of the second embodiment of the invention, the coding uses redundant bits in an IP frame structure or is added as a separate field in a payload of the IP packet.

In step S102, a service class and/or message type of the plurality of service classes and/or message types is detected for an incoming request message. In step S103, a predetermined content of a data packet for the service class and/or message type detected is determined out of the plurality of predetermined contents of data packets from the map.

In step S104, the incoming request message is forwarded in the data packet including the predetermined content. In other words, the predetermined content is transmitted in the data packet forwarding the incoming request message. For example, the first apparatus 100 transmits the data packet to the second apparatus 200 via the link 1020. Thereafter, the first process ends.

For example, when the P-CSCF receives an incoming SIP message bound for a UE, in step S102 the P-CSCF detects the message type and/or the service class requested by the message, and based on that, in step S103 determines which IP address and/or port or coding to use when sending the SIP message in an IP packet further to the P-GW in step S104.

It is to be noted that the first process is not limited to the order of steps illustrated in FIG. 3. For example, the order of steps S101 and S102 may be exchanged.

Now reference is made to the second process illustrated in FIG. 3.

In step S201 of the second process, the map (first map) between the plurality of service classes and/or message types and the plurality of predetermined contents of data packets is acquired.

As described above with respect to the first process, the predetermined contents preferably comprise predetermined addresses and/or ports used between the first apparatus 100 and the second apparatus 200.

That is, according to an example of the first embodiment of the invention, the P-CSCF and P-GW are configured to map the service classes/message types to given IP addresses and/or ports used between the P-CSCF and P-GW.

Similarly as described above with respect to the first process, according to an example of the second embodiment of the invention, the predetermined contents comprise predetermined coding.

In step S202, a predetermined content of a data packet forwarding an incoming request message is detected. In step S203, a service class and/or message type of the plurality of service classes and/or message types is determined for the incoming request message, from the predetermined content detected, out of the plurality of predetermined contents of data packets from the first map.

In step S204, the incoming request message is forwarded in a data block including a predetermined indication of the service class and/or message type determined. In other words, the predetermined indication is transmitted in the data block forwarding the incoming request message. For example, the second apparatus 200 transmits the data block to the third apparatus 300 via the link 2030. Thereafter, the second process ends.

According to an example of the first embodiment, when receiving an IP packet from the P-CSCF, the P-GW deduces from the used IP address and/or port whether a given SCI (service class indicator) code shall be used/inserted when sending payload (including the SIP message (incoming request message)) within a user plane protocol frame (e.g. GTP-U) to the S-GW.

According to an example of the second embodiment, when receiving an IP packet from the P-CSCF, the P-GW deduces from the predetermined redundant bits ((re-)used here for transporting the predefined coding) and/or the predetermined field of the payload of the IP packet including the predetermined coding, whether the given SCI code shall be used/inserted.

The S-GW may send the SCI further to the MME in a DDN (downlink data notification) message. The MME may use this received service class/message type indication/SCI parameter e.g. to determine which kind of paging procedure to apply, if paging is needed e.g. because the UE is in IDLE state.

According to an embodiment of the invention, the predetermined indication comprises the service class indicator (SCI). According to another embodiment of the invention, the predetermined indication comprises predetermined data block contents. That is, according to an example of a third embodiment, if PMIP is used instead of GTP between the P-GW and S-GW, a similar address/port mechanism (and/or coding mechanism) can be applied also between the P-GW and S-GW, e.g. to replace the SCI parameter used in the GTP case.

According to the third embodiment, in step S203 a second map between the plurality of service classes and/or message types and a plurality of predetermined data block contents is acquired, and a predetermined data block content for the service class and/or message type determined, is determined out of the plurality of predetermined data block contents from the second map. In step S204, the incoming request message is forwarded in the data block including the predetermined data block content.

According to a first example of the third embodiment, the predetermined data block contents comprise predetermined addresses and/or ports used between the second apparatus 200 and the third apparatus 300.

According to a second example of the third embodiment, the predetermined data block contents comprise predetermined coding. Then, in step S204, the predetermined coding determined from the second map for the service class and/or message type determined from the first map, is included in predetermined redundant bits of a frame structure of the data block and/or in a predetermined field of a payload of the data block.

It is to be noted that the second process is not limited to the order of steps illustrated in FIG. 3. For example, the order of steps S201 and S202 may be exchanged.

Now reference is made to the third process illustrated in FIG. 3.

The third process is used with respect to the third embodiment in which a similar address/port/coding mechanism is applied between the P-GW and the S-GW. In step S301, a map (the second map) between the plurality of service classes and/or message types and the plurality of predetermined contents of data blocks is acquired.

In step S302, when a data block forwarding an incoming request message is received, a predetermined content of the data block is detected, and in step S303 a service class and/or message type of the plurality of service classes and/or message types is determined for the incoming request message, from the predetermined content detected, out of the plurality of predetermined contents of data blocks from the second map.

In step S304, a predetermined indication of the service class and/or message type determined is transmitted in a downlink data notification (DDN) message. Thereafter, the third process ends.

It is to be noted that the third process is not limited to the order of steps illustrated in FIG. 3. For example, the order of steps S301 and S302 may be exchanged.

With the above-described arrangements, different paging procedures can be applied to different incoming services and/or SIP message types or contents. The differentiation is based on a service class/message type indication/SCI parameter inserted in the DDN message sent by the S-GW to the MME to indicate the priority level to be used for paging. The S-GW detects the incoming services from the SCI code inserted within a user plane protocol frame sent to the S-GW or the used IP address and/or port and/or coding when using PIMP interface between the P-GW and the S-GW, in order to be able to allocate different SCIs to the incoming services.

Figure 4:
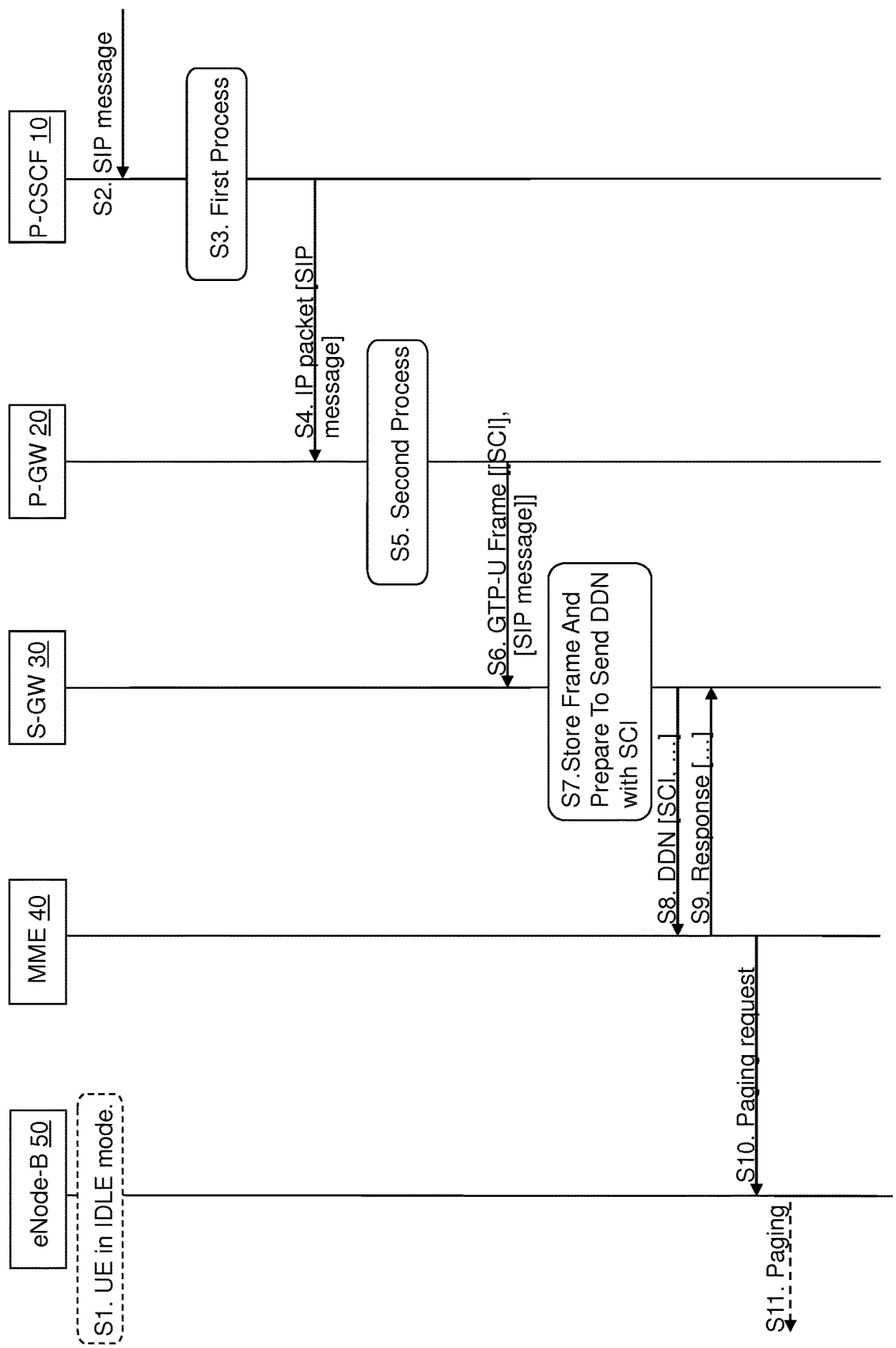
FIG. 4 shows a signaling diagram illustrating a method of paging optimization for an incoming service request in a 3GPP IMS network.

In the following an implementation example according to the first embodiment of the invention will be described by referring to the signalling diagram shown in FIG. 4.

Step S1 illustrates that a UE attached to an eNode-B 50 is in the IDLE mode.

In step S2, a P-CSCF 10 (in which the first process of FIG. 3 is executed) receives an incoming SIP message bound for the UE.

In step S3, the P-CSCF 10 detects the SIP message type and/or the service requested by the message. The P-CSCF 10 determines the IP address and/or port (e.g. source or destination or both) to be used when sending the message in an IP packet to a P-GW 20.

In step S4, the P-CSCF 10 sends an IP packet with the SIP message as a payload to the P-GW 20.

In step S5, the P-GW 20 (in which the second process of FIG. 3 is executed) deduces the service class from the IP address and/or port (e.g. source or destination or both) of the IP packet incoming from the P-CSCF 10. The P-GW 20 derives a relevant/related SCI code to be used towards an S-GW 30.

In step S6, the P-GW 20 sends a GTP-U frame with the SCI code as a parameter and the SIP message as a payload to the S-GW 30.

In step S7, the S-GW 30 stores/buffers the GTP-U frame with its payload to wait for the UE to be paged and prepares to send a DDN (downlink data notification) message with the SCI to an MME 40.

In step S8, the S-GW 30 sends a DDN message with the SCI code as a parameter to the MME 40.

In step S9, the MME 40 may send an acknowledgement to the S-GW 30.

In step S10, the MME 40 deduces from the SCI code which kind of paging procedure to use and prepares to send a relevant paging request, or paging requests, to a relevant eNode-B or eNode-Bs (eNode-B 50 in the example).

In step S11, paging takes place.

According to the above-described embodiments, optimization of paging procedures can be achieved, aiming at reduced message loading for lower priority services and faster paging e.g. for certain real-time services in 3GPP mobile networks, being requested by some operators.

According to a first aspect of the invention, a first apparatus for use in a communication network system is provided. According to an example embodiment of the invention, the first apparatus comprises the first apparatus 100 of FIG. 2.

The first apparatus comprises means for acquiring a map between a plurality of service classes and/or message types and a plurality of predetermined contents of data packets, means for detecting a service class and/or message type of the plurality of service classes and/or message types, for an incoming request message, means for determining a predetermined content of a data packet for the service class and/or message type detected, out of the plurality of predetermined contents of data packets from the map, and means for forwarding the incoming request message in the data packet including the predetermined content.

According to an example embodiment of the invention, the map is stored in the first memory resources 102 and is acquired by the first processing resources 101 using the link 104. According to another example embodiment, the map is acquired by the first processing resources and first memory resources 102 using the first interfaces 103.

According to an example embodiment of the invention, the incoming request message is a message according to a session initiation protocol (SIP).

According to an example embodiment of the invention, the data packet is a packet according to an internet protocol (IP).

According to an example embodiment of the invention, the predetermined contents comprise predetermined addresses and/or ports used between the first apparatus forwarding the incoming request message and a second apparatus receiving the incoming request message forwarded by the first apparatus.

According to an example embodiment of the invention, the predetermined contents comprise predetermined coding, and the first apparatus comprises means for including the predetermined coding determined from the map for the service class and/or message type detected, in predetermined redundant bits of a frame structure of the data packet and/or in a predetermined field of a payload of the data packet.

According to an example embodiment of the invention, the means for acquiring, detecting, determining, including and forwarding are implemented by the first processing resources 101, the first memory resources 102 and the first interfaces 103.

According to a second aspect of the invention, a second apparatus for use in the communication network system is provided. According to an example embodiment of the invention, the second apparatus comprises the second apparatus 200 of FIG. 2.

The second apparatus comprises means for acquiring a first map between a plurality of service classes and/or message types and a plurality of predetermined contents of data packets, means for detecting a predetermined content of a data packet forwarding an incoming request message, means for determining a service class and/or message type of the plurality of service classes and/or message types, for the predetermined content detected, out of the plurality of predetermined contents of data packets from the first map, and means for forwarding the incoming request message in a data block including a predetermined indication of the service class and/or message type determined.

According to an example embodiment of the invention, the first map is stored in the second memory resources 202 and is acquired by the second processing resources 201 using the link 204. According to another example embodiment, the first map is acquired by the second processing resources 201 and second memory resources 202 using the second interfaces 203.

According to an example embodiment of the invention, the incoming request message is a message according to a session initiation protocol (SIP).

According to an example embodiment of the invention, the data packet is a packet according to an internet protocol (IP).

According to an example embodiment of the invention, the data block is a frame according to a user plane protocol.

According to an example embodiment of the invention, the data block is a packet according to an internet protocol (IP).

According to an example embodiment of the invention, the predetermined contents comprise predetermined addresses and/or ports used between the first apparatus forwarding the incoming request message and the second apparatus receiving the incoming request message forwarded by the first apparatus.

According to an example embodiment of the invention, the predetermined contents comprise predetermined coding.

According to an example embodiment of the invention, the predetermined indication comprises a service class indicator (SCI).

According to an example embodiment of the invention, the predetermined indication comprises predetermined data block contents.

According to an example embodiment of the invention, the second apparatus comprises means for detecting the predetermined coding included in the data packet in predetermined redundant bits of a frame structure of the data packet and/or in a predetermined field of a payload of the data packet.

According to an example embodiment of the invention, the second apparatus comprises means for acquiring a second map between the plurality of service classes and/or message types and a plurality of predetermined data block contents, means for determining a predetermined data block content for the service class and/or message type determined, out of the plurality of predetermined data block contents from the second map, and means for forwarding the incoming request message in the data block including the predetermined data block content.

According to an example embodiment of the invention, the second map is stored in the second memory resources 202 and is acquired by the second processing resources 201 using the link 204. According to another example embodiment, the second map is acquired by the second processing resources 201 and second memory resources 202 using the second interfaces 203.

According to an example embodiment of the invention, the predetermined data block contents comprise predetermined addresses and/or ports used between the second network apparatus receiving the incoming request message forwarded by the first apparatus in the data packet and a third apparatus receiving the incoming request message forwarded by the second apparatus in the data block.

According to an example embodiment of the invention, the predetermined data block contents comprise predetermined coding.

According to an example embodiment of the invention, the second apparatus comprises means for including the predetermined coding determined from the second map for the service class and/or message type determined from the first map, in predetermined redundant bits of a frame structure of the data block and/or in a predetermined field of a payload of the data block.

According to an example embodiment of the invention, the means for acquiring, detecting, determining, including and forwarding are implemented by the second processing resources 201, second memory resources 202 and second interfaces 203.

According to a third aspect of the invention, a third apparatus for use in the communication network system is provided. According to an example embodiment of the invention, the third apparatus comprises the third apparatus 300 of FIG. 2.

The third apparatus comprises means for acquiring a map between a plurality of service classes and/or message types and a plurality of predetermined contents of data blocks, means for detecting a predetermined content of a data block forwarding an incoming request message, means for determining a service class and/or message type of the plurality of service classes and/or message types, for the incoming request message, from the predetermined content detected, out of the plurality of predetermined contents of data blocks from the map, and means for transmitting a predetermined indication of the service class and/or message type determined in a downlink data notification message.

According to an example embodiment of the invention, the map is stored in the third memory resources 302 and is acquired by the third processing resources 301 using the link 304. According to another example embodiment, the map is acquired by the third processing resources 301 and third memory resources 302 using the third interfaces 303.

According to an example embodiment of the invention, the means for acquiring, detecting, determining and transmitting are implemented by the third processing resources 301, third memory resources 302 and third interfaces 303.

According to an aspect of the invention, a map between a plurality of service classes and/or message types and a plurality of predetermined contents of data packets is acquired. A service class and/or message type is detected for an incoming request message. A predetermined content of a data packet corresponding to the service class and/or message type is determined from the map. The incoming request message is forwarded in the data packet including the predetermined content. Then, the predetermined content of the data packet is detected, the service class and/or message type corresponding to the predetermined content is determined from the map, and the incoming request message is forwarded in a data block including a predetermined indication of the service class and/or message type determined.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method for use by a call session control function of a communication network system, the method comprising:
    acquiring a mapping between a plurality of service classes and a plurality of predetermined codings in data packets configured for optimization of paging procedures, the data packets being packets according to an internet protocol, wherein the call session control function supports predetermined codings according to IPv6, wherein the mapping comprises at least one service class related coding corresponding with at least one of the plurality of service classes;
    detecting a service class of the plurality of service classes for an incoming request message, wherein the incoming request message is a message according to a session initiation protocol;
    determining, from the mapping, a predetermined coding for the service class detected, out of the plurality of predetermined codings;
    including the predetermined coding, determined from the mapping, for the service class detected, into a data packet; and
    forwarding the incoming request message in the data packet including the predetermined coding to a packet data network gateway.

2. The method of claim 1, wherein:
    the incoming request message is a message according to a session initiation protocol (SIP); or
    the data packet is a packet according to an internet protocol (IP).

3. The method of claim 1, further comprising: including the predetermined coding determined from the mapping for the service class detected in the predetermined redundant bits of a frame structure of the data packet.

4. A computer program product embodied on a non-transitory computer-readable medium, said computer program product including a program for a processing device, comprising software code portions for performing the steps of claim 1 when the program is run on the processing device.

5. The computer program product according to claim 4, wherein the program is directly loadable into an internal memory of the processing device.

6. A call session control function for use in a communication network system, the call session control function comprising at least one processor and at least one memory including computer program code, the at least one memory and the computer program code configured to, with the at least one processor, cause the call session control function at least to perform:
    acquiring a mapping between a plurality of service classes and a plurality of predetermined codings in data packets configured for optimization of paging procedures, the data packets being packets according to an internet protocol, wherein the call session control function supports predetermined codings according to IPv6, wherein the mapping comprises at least one service class related coding corresponding with at least one of the plurality of service classes;

detecting a service class of the plurality of service classes for an incoming request message, wherein the incoming request message is a message according to a session initiation protocol;

determining, from the mapping, a predetermined coding for the service class detected, out of the plurality of predetermined codings;

including the predetermined coding, determined from the mapping, for the service class detected, into a data packet; and forwarding the incoming request message in the data packet including the predetermined coding to a packet data network gateway.

7. The call session control function of claim 6, wherein:

the incoming request message is a message according to a session initiation protocol (SIP); or the data packet is a packet according to an internet protocol (IP).

8. The call session control function of claim 6, wherein the at least one memory and the computer program code are configured to, with the at least one processor, cause the call session control function to perform:

including the predetermined coding determined from the mapping for the service class detected in the predetermined redundant bits of a frame structure of the data packet.

* * * * *